United States Patent
Basson et al.

(10) Patent No.: US 10,671,601 B2
(45) Date of Patent: Jun. 2, 2020

(54) PLATFORM FOR CONSULTING SOLUTION

(71) Applicant: International Business Machines Corporation, Armonk, NY (US)

(72) Inventors: Sara H. Basson, White Plains, NY (US); Kember A.-R. Forcke, Richmond, VA (US); Richard T. Goodwin, Dobbs Ferry, NY (US); Kaan K. Katircioglu, Yorktown Heights, NY (US); Meir M. Laker, Spring Valley, NY (US); Pietro Mazzoleni, New York City, NY (US); Nitinchandra R. Nayak, Ossining, NY (US); John G. Vergo, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 978 days.

(21) Appl. No.: 14/562,987

(22) Filed: Dec. 8, 2014

(65) Prior Publication Data
US 2016/0162538 A1 Jun. 9, 2016

(51) Int. Cl.
G06F 7/00 (2006.01)
G06F 17/00 (2019.01)
G06F 16/242 (2019.01)
G06Q 30/00 (2012.01)

(52) U.S. Cl.
CPC ......... G06F 16/2425 (2019.01); G06Q 30/00 (2013.01)

(58) Field of Classification Search
CPC .................. G06F 17/30395; G06Q 30/00

USPC .......................................... 707/774
See application file for complete search history.

(56) References Cited

U.S. PATENT DOCUMENTS

| | | | |
|---|---|---|---|
| 6,523,026 B1 * | 2/2003 | Gillis | G06F 16/3332 707/E17.062 |
| 7,444,293 B1 * | 10/2008 | Kahn | G06Q 50/22 705/3 |
| 7,716,174 B2 * | 5/2010 | Lee | G06F 16/2471 707/600 |
| 7,721,201 B2 | 5/2010 | Grigoriadis et al. | |
| 7,926,029 B1 * | 4/2011 | Stoyen | G06F 8/20 706/11 |
| 8,175,911 B2 | 5/2012 | Cao et al. | |
| 8,239,426 B2 | 8/2012 | Rangadass et al. | |
| 8,340,999 B2 | 12/2012 | Kumaran et al. | |
| 8,412,549 B2 | 4/2013 | Graeber et al. | |

(Continued)

OTHER PUBLICATIONS

Mell et al., "The NIST Definition of Cloud Computing", Version 15, Oct. 7, 2009, National Institute of Standards and Technology, Information Technology Laboratory.

(Continued)

Primary Examiner — Pavan Mamillapalli
(74) Attorney, Agent, or Firm — Reza Sarbakhsh

(57) ABSTRACT

Receiving a first model associated with a user, a generic model of a generic domain, and a specific domain having an associated domain-specific corpus. A first set of query terms based on elements of the first model, and a second set of query terms based on elements of the generic model, are determined. A third set of query terms is generated based on the first and second sets of query terms. The domain specific corpus is queried using the third set of query terms, and a domain specific model is generated based on results of the querying.

20 Claims, 7 Drawing Sheets

(56) References Cited

U.S. PATENT DOCUMENTS

| | | | | |
|---|---|---|---|---|
| 9,183,308 | B1* | 11/2015 | Mark | G06F 16/9535 |
| 9,367,814 | B1* | 6/2016 | Lewis | G06F 16/285 |
| 9,607,264 | B2* | 3/2017 | Downs | G06F 17/2745 |
| 2005/0251789 | A1* | 11/2005 | Peck | G06F 8/34 717/113 |
| 2005/0262196 | A1* | 11/2005 | Mueller | G06Q 10/087 709/203 |
| 2006/0161544 | A1* | 7/2006 | Lee | G06F 16/2471 707/999.006 |
| 2006/0206472 | A1* | 9/2006 | Masuichi | G06F 17/2785 707/999.004 |
| 2006/0212288 | A1* | 9/2006 | Sethy | G06F 17/2715 704/10 |
| 2007/0250362 | A1 | 10/2007 | Vacante et al. | |
| 2008/0046419 | A1* | 2/2008 | Lee | G06F 17/3043 707/999.004 |
| 2008/0091633 | A1* | 4/2008 | Rappaport | G06N 5/022 706/50 |
| 2009/0287678 | A1* | 11/2009 | Brown | G06F 17/30654 707/999.005 |
| 2010/0153324 | A1* | 6/2010 | Downs | G06F 17/2745 706/21 |
| 2012/0011157 | A1* | 1/2012 | Mauclaire | G06F 8/35 707/777 |
| 2012/0253799 | A1* | 10/2012 | Bangalore | G10L 15/183 704/231 |
| 2013/0030850 | A1 | 1/2013 | Marrelli et al. | |
| 2013/0073366 | A1 | 3/2013 | Heath | |
| 2013/0262449 | A1* | 10/2013 | Arroyo | G06F 16/3325 707/722 |
| 2014/0297297 | A1* | 10/2014 | Head | G16H 50/20 705/2 |
| 2016/0070731 | A1* | 3/2016 | Chang | G06F 17/30598 707/741 |
| 2016/0078515 | A1* | 3/2016 | Mueller | G06Q 10/087 705/26.5 |

OTHER PUBLICATIONS

U.S. Appl. No. 14/287,474, filed May 27, 2014, entitled: "Dynamic Creation of Domain Specific Corpora".

* cited by examiner

PLATFORM FOR CONSULTING SOLUTION

FIELD OF THE INVENTION

The present disclosure generally relates to data modeling, and more specifically to generating domain specific models using analytic tools.

BACKGROUND

Current technologies allow for accessing and searching large amounts of structured and unstructured digital data from a wide variety of sources. For example, internet search engines allow searches of websites, documents, images, and other types of structured and unstructured data. However, tools that provide insight into data collected from these sources are limited.

BRIEF SUMMARY

Embodiments of the present disclosure provide a method, system, and computer program product for generating a specific model of a domain. This includes receiving (i) a first model associated with a user, (ii) a generic model of a generic domain, and (iii) a specific domain having an associated domain-specific corpus. A first set of query terms is generated based on elements of the first model, and a second set of query terms based on elements of the generic model, and a third set of query terms is generated based on the first and second sets of query terms. The domain specific corpus is queried using the third set of query terms. A domain specific model is generated based on results of the querying.

DETAILED DESCRIPTION

Embodiments of the present invention include one or more methods, systems, and computer program products for generating a domain specific data model (hereinafter, "domain specific model"). Some embodiments generate the domain specific model iteratively based on interactions with a user who can guide the process and derive insight from it.

In one example, the user may correspond to a business, and may use embodiments of the invention to generate a business plan by providing little to no information about the business. This example will be elaborated on as embodiments of the invention are discussed in more detail in connection with the Figures, below.

Figure 1:
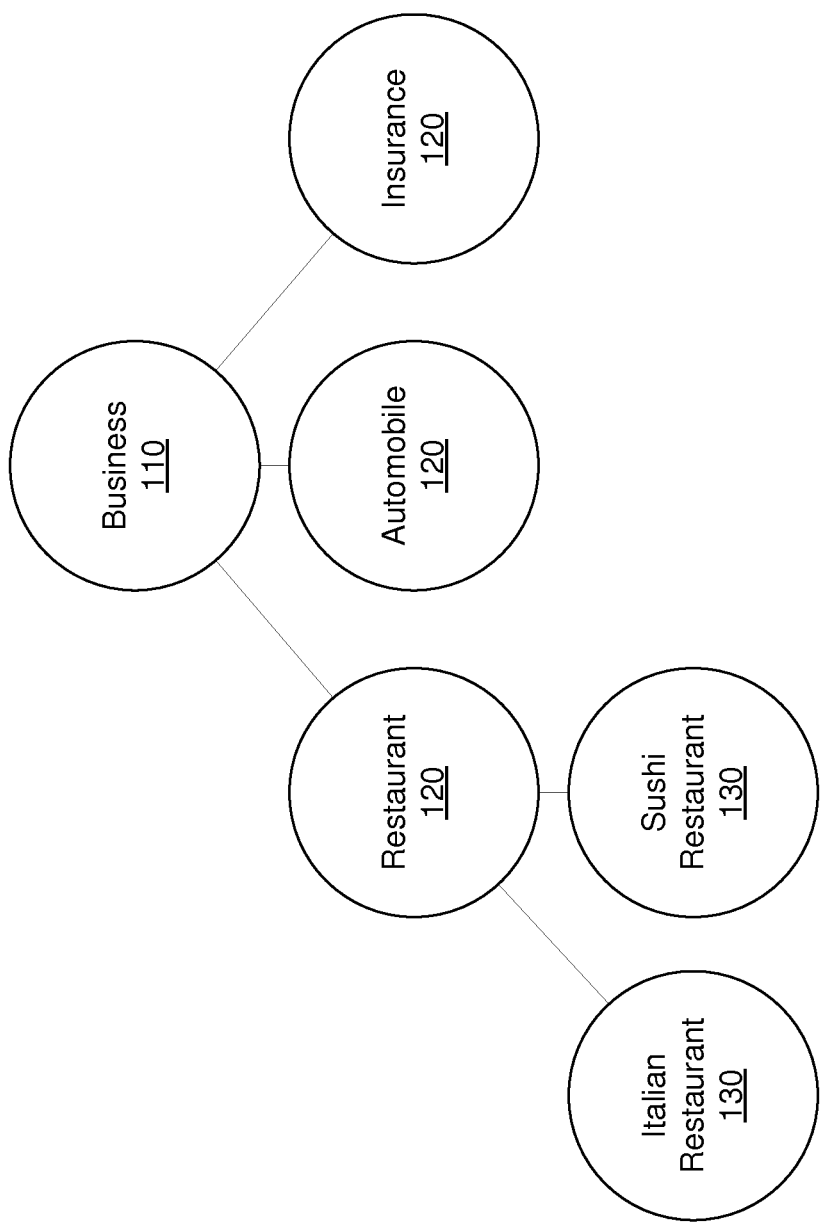
FIG. 1 is a schematic block diagram depicting a domain hierarchy, according to an aspect of the present disclosure.

FIG. 1 depicts a domain hierarchy 100 having a set of domain nodes. Each domain node may be associated with a data model. In this embodiment, domain hierarchy 100 is defined as a business domain hierarchy. Accordingly, domain nodes in domain hierarchy 100 may include root node 110 (business domain node), a first set of dependent nodes 120 (restaurant, automobile, and insurance domain nodes) depending directly from root node 110, and a second set of dependent nodes 130 (Italian restaurant and sushi restaurant domain nodes), which depend from the first set of dependent nodes 120.

According to an embodiment, each domain node in domain hierarchy 100 is associated with a data model that may include elements and sub-elements that define attributes of that domain node. For example, a data model associated with root node 110 describes root node 110 (it may also describe domain hierarchy 100 in general terms). This data model can be referred to as a general model of the domain of root node 110.

According to an embodiment, the data model associated with root node 110 may be a business plan. The business plan may have elements that describe the business domain in general terms. For example, a business plan may have the following elements: {market analysis, marketing strategy, sales strategy, operations, investment analysis}. Each of these elements may be associated with data that describe an aspect of a business plan. Each element may have sub-elements. For example, the market analysis element may have the following sub-elements: {market segmentation, target market, segment strategy, market size, expected market, market location analysis, market penetration, competitive analysis, competitive landscape, competition, competitor profile, differentiation, competitive edge, competitive strategy, typical customer, buying patterns, market need, market trends, failed business analysis, successful business analysis}. Each element and sub-element of the business plan may have associated data the describe attributes of a business. For example, the associated data may be textual data.

A data model associated with a domain node in the first set of dependent nodes 120, or a domain node in the second set of dependent nodes 130, may be referred to as a domain specific model. For example, restaurant node 120 may be associated with a data model that describes a restaurant business "Restaurant 1". The data model of restaurant node 120 may have the following elements in addition to elements of the business data model of root node 110: {cuisine type, workforce size, ownership type}. The "cuisine type" element may, for example, define the type of cuisine offered by Restaurant 1, and may be, for example, "vegetarian". The "workforce size" element may define how many individuals Restaurant 1 employs; for example, 50. The "ownership type" element may define the company's legal ownership status; for example, privately held company.

In an embodiment, whether a domain of a domain node in domain hierarchy 100 is a general domain or a specific domain may be based on its relative relationship to other nodes in domain hierarchy 100. For example, restaurant node 120 may be a specific domain relative to business node 110 from which it depends, and may be a general domain relative to Italian node 130 where Italian node 130 depends from restaurant node 120. Even the domain of root node 110 may be defined as a specific domain relative to another domain of another domain hierarchy, from which domain hierarchy 100 may depend.

Similarly, a data model associated with sushi restaurant node 130 may have at least the elements of the business data model and the restaurant business data model, corresponding to root node 110 and restaurant node 120 from which sushi restaurant node 130 depends; and it may have additional elements specific to the sushi restaurant business.

Domain hierarchy 100 is merely an example. Other domain definitions and dependencies are possible; for example, the healthcare domain, whose dependent nodes may include, for example, hospital, clinic, homecare, etc.

Figure 2:
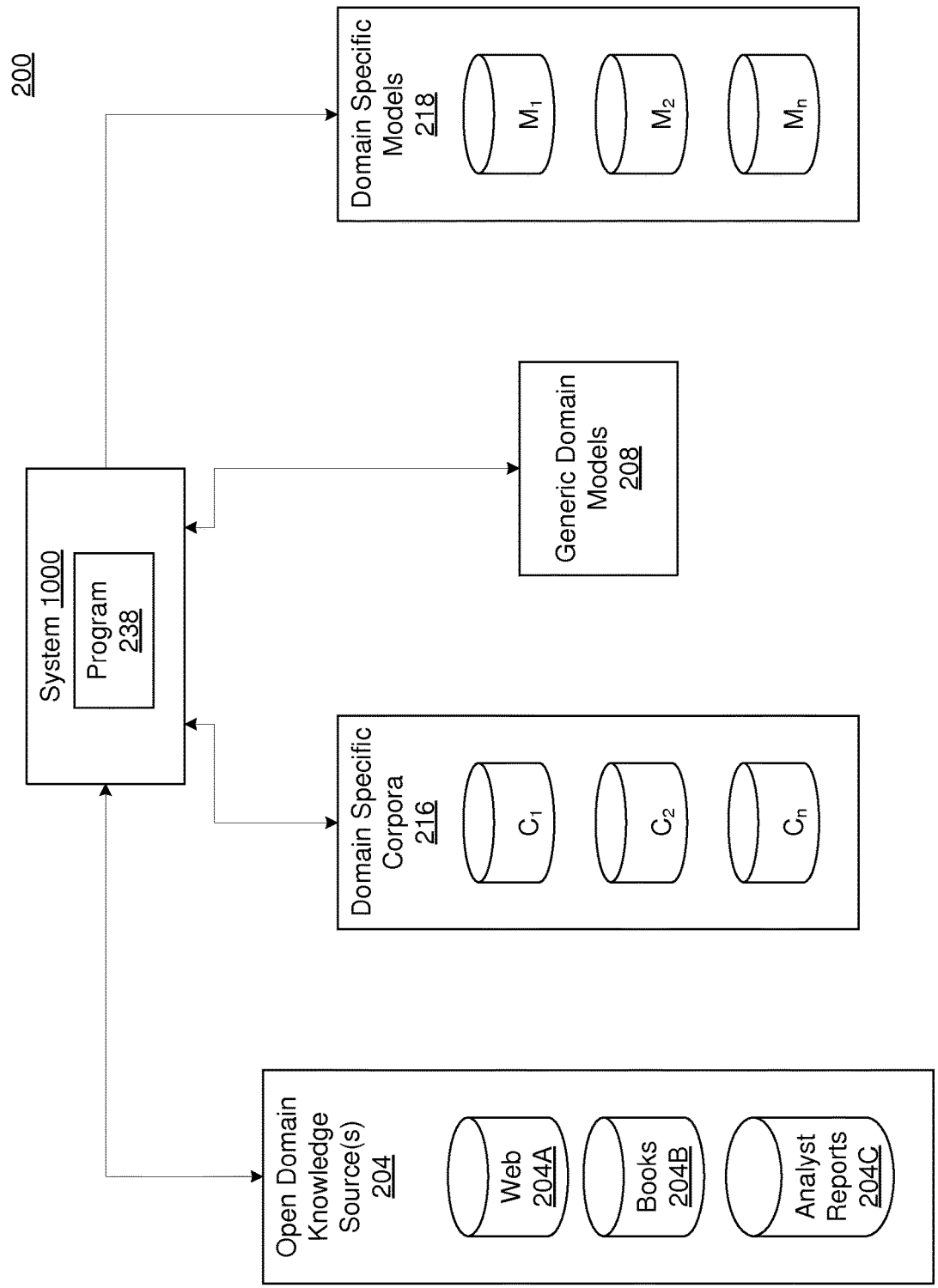
FIG. 2 is a schematic block diagram of a computer system for generating a domain specific model, according to an aspect of the present disclosure.

FIG. 2 is a schematic block diagram depicting an exemplary computing environment 200 for generating a domain specific model associated with a domain node in domain hierarchy 100 (FIG. 1), according to an aspect of the invention. Computing environment 200 may include a computer system 1000. Computer system 1000 may be a computing device as defined and described in greater detail in connection with FIG. 5, below. Computer system 1000 may include a computer program 238 executable by a processor in computer system 1000 (or by another processor). Program 238 may include program instructions to execute a method 400 as described in greater detail in connection with FIG. 4, below.

Generally, computer system 1000 may generate a domain specific model 218 based on data stored in domain specific corpora 216, by analyzing the data in conjunction with generic domain models 208. The data stored in domain specific corpora 216 may be obtained from one or more open domain knowledge sources 204. Each of these components is defined in detail, below.

An open domain knowledge source 204 may include one or more raw data sets stored on a tangible storage device accessible by the system 1000. The tangible storage device may be an internal component of the computer system 1000 or an external device. Examples of such data sets include data available through the Web 204A (e.g., data available on the internet), books 204B (e.g., digital books, audiobooks, digitally stored illustrations), and analyst reports 204C (e.g. electronic reports of financial data). These are merely examples. Embodiments of the invention may use additional or alternative open domain knowledge sources 104, or any other knowledge sources. These sources may be available, for example, through an electronic format, and may be structured or unstructured data.

A generic domain model 208 may include a data model as described in connection with FIG. 1, above. A generic domain model 208 may be, for example, the business model (e.g., business plan) associated with root node 110 (FIG. 1).

Domain specific corpora 216 may include one or more sets of data C (for example, $C_1$-$C_n$) associated with a given domain(s). These sets of data may include, for example, one or more documents containing information or data models, such as text, that relate to the given domain. For example, $C_1$-$C_n$ may include sets of business plan documents for various businesses, or business plan documents for a specific business. A given document in each of these sets may be selected for inclusion in the domain specific corpora 216 based on how well it conforms to a desired characteristic of the domain model to which it corresponds. In an embodiment, the selected document(s) may be a well-defined business plan containing wide-ranging and comprehensive elements, terminology, descriptions, other data, and content organization that may be representative of a desirable business plan.

Domain specific models 218, for example domain specific models $M_1$-$M_n$, are data models associated with a specific domain in domain hierarchy 100 (FIG. 1). Generally, domain specific models 218 are outputted by system 1000 according to the method 400 (FIG. 4) performed by program 238.

Figure 3:
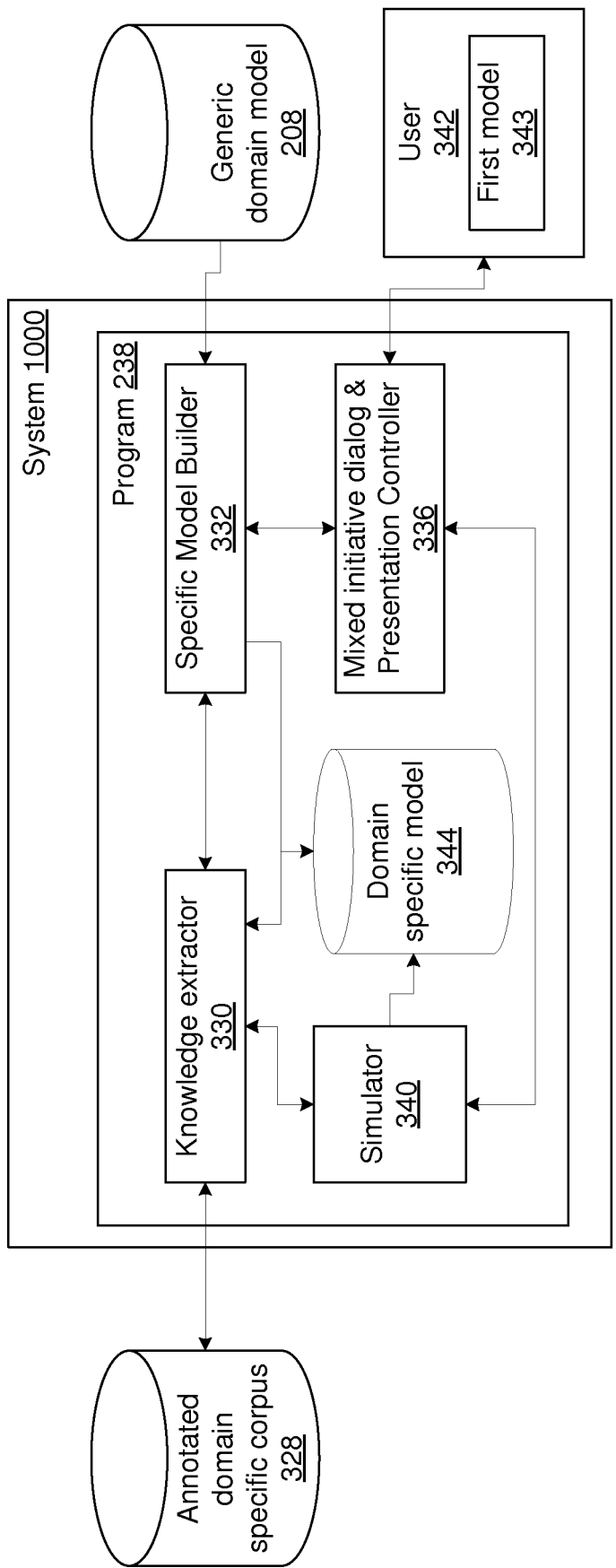
FIG. 3 is a schematic block diagram of additional details of the computer system of FIG. 2 for generating a domain specific model, according to an aspect of the present disclosure.
Figure 4:
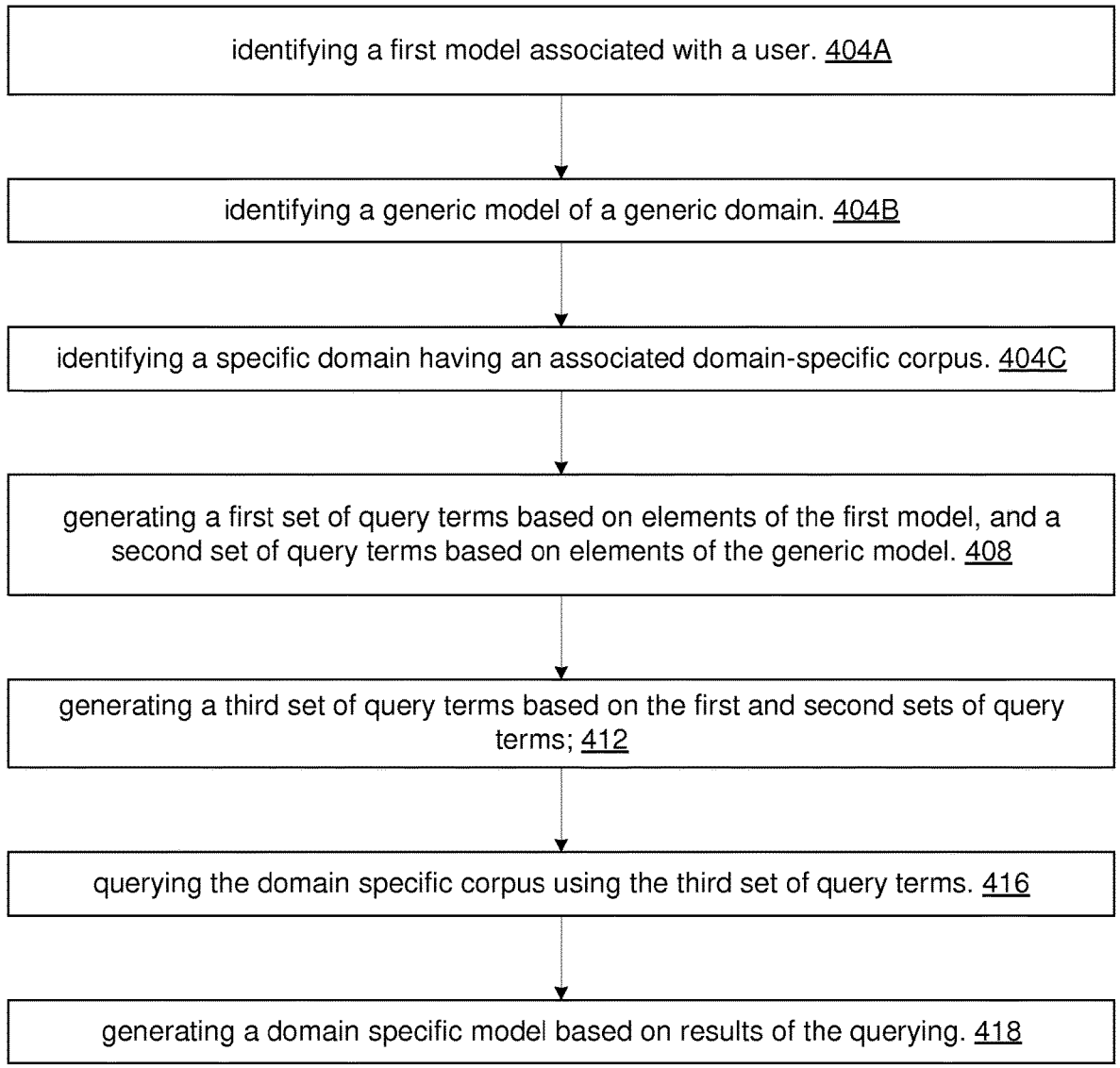
FIG. 4 is a flowchart of a method for generating a domain specific model, according to an aspect of the present disclosure.

FIG. 3 is a schematic block diagram of computer system 1000 (FIG. 2) for generating a domain specific model, according to an aspect of the present disclosure. Like elements in FIGS. 2 and 3 are labeled using identical reference characters. FIG. 4 is a flowchart of a method 400 for generating a domain specific model using the computer system 1000 of FIGS. 2-3, according to an aspect of the present disclosure. Method 400 is executable via program instructions of computer program 238, which in turn, may be executed by a processor of computer system 1000. In each Figure, including FIG. 3, although components of a given system depicted are depicted as being within or outside of the given system, the systems may be configured differently without departing from the spirit or scope of the present invention. For example, while generic domain model 208 is depicted as a component outside of system 1000, it may in fact be stored on a tangible storage medium that is part of system 1000.

Referring now to FIGS. 3 and 4, at step 404A, method 400 for generating a domain specific model may receive a first model 343 associated with a user 342. The identification may be performed by a program module of program 238, such as specific model builder 332. Program 238 may receive first model 343 from, for example, a database or an input source. First model 343 may be a data model having elements that define user's 342 attributes. In an embodiment, during a first execution of method 400, first model 343 may be blank, or may contain some attribute definitions and information about user 342. Non-limiting examples of first model 343 include: spreadsheet; Quickbooks® file; Quicken® file.

User 342 may be a person in communication with system 1000 through a communications interface (for example, a computer terminal having an I/O interface), or it may be a computer program or process configured to provide the first data model as an input to method 400. User 342 may be, in one example, the restaurant business, Restaurant 1. In this example, first model 343 associated with Restaurant 1 may include elements that define attributes of Restaurant 1, such as its location, filed of operation, offered services, size, ownership, assets, etc.

User 342 may be in communication with computer system 1000 through a mixed initiative dialog and presentation controller 336 (hereinafter, "controller 336") of program 238. Controller 336 may be in communication with one or more I/O devices of system 1000 including, for example, the following: an audio input device in communication with a voice recognition engine for receiving human speech and transforming corresponding audio data to structured digital data; a photographic or video input device in communication with an image recognition engine for receiving graphical information corresponding to gestures or movements; an input device for receiving instructions or selections (for example, a keyboard, a mouse, etc.). Program 238 may receive various information from user 342 or from another source during execution of method 400 to modify first model 343.

Method 400 may, at step 404B, receive a generic model of a generic domain using specific model builder 332. The generic model of the generic domain may be used in other steps to generate a domain specific model. The generic model of a generic domain may be generic model 208 (FIGS. 2 and 3). Generic model 208 may be, for example, a business plan as described in connection with domain hierarchy 100 and root node 110 (FIG. 1). The identification by method 400 of generic model 208 at step 404B may be based, in an embodiment, on information in first model 343, identified at step 404A. For example, an element of first model 343 may define a specific domain of Restaurant 1: restaurant domain. A further element of first model 343 may further define the general domain of Restaurant 1 as: business domain. The definition of the domain of Restaurant 1 and its relationship to other domains in a domain hierarchy may be according to domain hierarchy 100 (FIG. 1). In another embodiment, these definitions may be stored in a configuration file, and need not be part of first model 343.

Method 400 may, at step 404C, identify a specific domain having an associated domain-specific corpus, using specific model builder 332. This identification may also be based on the specific domain information defined by elements of first model 343 (or defined in a configuration file). Continuing with the example of Restaurant 1, the specific domain identified at step 404C may be the specific domain of first model 343, i.e., restaurant business.

The domain specific corpus associated with the specific domain identified at step 404C may be a corpus of documents relating to the identified specific domain. In an embodiment, the domain specific corpus may be the annotated domain specific corpus 328. Continuing with the example of Restaurant 1, the annotated domain specific corpus 328 identified at step 404C may be a corpus of business plans for the restaurant industry.

Generally, a document may be included in the domain specific corpus 328 based on how well its elements correspond to elements of the specific domain of the specific corpus 328. The document selection process may be manual or automated. For example, a set of restaurant business plans may be assembled and annotated, manually or automatically, because they are deemed to have a desired level of quality based on how well they correspond to elements of an ideal restaurant business plan.

The annotated domain specific corpus 328 (or corpora) may be generated using a module of program 238, or by another program of system 1000, or by a program of another system. Some embodiments for generating a domain specific corpus are described in detail in the disclosure of commonly-owned, co-pending United States patent application filed on May 27, 2014, the contents and disclosure of which is expressly incorporated by reference herein in its entirety: U.S. patent application Ser. No. 14/287,474, for "DYNAMIC CREATION OF DOMAN SPECIFIC CORPORA".

For example, a domain-specific corpus 328 may be generated as follows. A corpus of select documents corresponding to a set of elements of a model of a domain is received, and a set of select topics is generated based on the corpus of select documents. Topics of an additional document are compared to the set of select topics to obtain a distance measure between the topics of the additional document and the set of select topics. Upon the distance measure matching a set of selection criteria, the additional document is added to a new corpus. The new corpus may be the domain specific corpus 328. The additional document may be annotated with the set of elements of the model, so that the domain specific corpus 328 may also be referred to as an annotated corpus. Topics of the set of select topics may be updated to include topics of the additional document.

The received corpus of select documents may be generated based on a parameterized search of a set of starting documents. The set of starting documents may be, for example, a set of documents available on the open domain knowledge source(s) 204 (FIG. 2). Each document in the set of starting documents may be assigned a quality measure, and may be added to the set of select documents upon the quality measure meeting a selection criterion.

Selecting the select documents from among the starting documents may be based on a search of the open domain knowledge source(s) 204 (FIG. 2) using a search phrase that is formed based on one or more of the following: a phrase from a domain-relevant ontology source; the select topics; and the topics of the additional document.

Steps 404A-C of method 400, and other steps generally, may occur in any order, and embodiments of the present invention are not limited to the order described above.

Method 400 may generate, at step 408, first and second sets of query terms, using specific model builder 332 of program 238, as follows. Specific model builder 332 may receive the following: first model 343 identified at step 404A (e.g., the document that defines attributes of Restaurant 1, which may be a configuration file); generic model 208 identified at step 404B (e.g., business plan); and, the specific domain identified at step 404C (e.g., restaurant business domain).

Specific model builder 332 may generate the first set of query terms based on elements of first model 343. For example, where elements of first model 343 are {cuisine type, workforce size, ownership type} having respective sub-elements "vegetarian", "50", and "privately held company", respectively, specific model builder 332 may choose one or more of these elements or sub-elements as terms in the first set of query terms.

In an embodiment, specific model builder 332 may, but need not, select one or more terms based on the elements or sub-elements of first model 343 without selecting the elements or sub-elements (or their associated data) themselves. For example, specific model builder 332 may select equivalents of those elements based on equivalency definitions according to an equivalency or association database (not shown). For example, "50" may have a defined association with "fewer than 100". In this example, specific model builder 332 may use "fewer than 100" as a term in the first set of query terms.

Specific model builder 332 may generate the second set of query terms based on terms elements of the generic model 208. For example, where generic model 208 is a business plan having elements and sub-elements defined above, specific model builder 332 may select one or more of the terms appearing in these elements or sub-elements (or their associated data) to include in the second set of query terms. Similar to how terms are selected for the first set of query terms, specific model builder 332 may, but need not, select one or more terms from generic model 208 based on an equivalency or association defined in a corresponding database (not shown). For example, "market segmentation" may have a defined association with "market fragmentation". In this example, specific model builder 332 may use "market segmentation" instead of "market segmentation".

At step 412, method 400 may generate (using, for example, specific model builder 332) a third set of query terms based on the first and second sets of query terms generated at step 408. The third set of query terms may include, in an embodiment, one or more possible combinations of terms in the first set and in the second set of query terms. Continuing with the example of Restaurant 1, one possible query term in the third set may be "competitive strategy fewer than 100 employees". This exemplary query term includes terms selected from the first set and from the second set of query terms generated at step 408.

At step 416, method 400 queries annotated domain specific corpus 328 using the third set of query terms generated at step 412 and using knowledge extractor 330. Knowledge extractor 330 may be a query module of program 238. Knowledge extractor 330 receives the third set of query terms and queries the annotated domain specific corpus 328, and returns matching documents or document elements that match a query criteria. The query criteria may be any known query or search criteria known in the art. For example, knowledge extractor 330 may return any document or document element that has at least one term from each component of the third set of query terms (i.e., at least one of the terms from each of the first and second sets of query terms); or any document that has all terms in the third set of query terms. The query criteria may require exact matching, or a less restrictive matching.

Furthermore, query parameters of knowledge extractor 330 may be configurable, including by a user, such as user 342. Accordingly, user 342 may iteratively run queries using knowledge extractor 330 to build specific data models. User 342 may modify query parameters to obtain different query results and to build new specific data models.

In an embodiment, knowledge extractor 330 may be a natural language question-answering (QA) tool. QA refers to the computer science discipline within the fields of information retrieval and natural language processing (NLP) known as Question Answering. QA relates to computer systems that can automatically answer questions posed in a natural language format. A QA application may be defined as a computer system or software tool that receives a question in a natural language format, and queries data repositories and applies elements of language processing, information retrieval, and machine learning to results obtained from the data repositories to generate a corresponding answer. An example of a QA tool is IBM's DeepQA technology, described in great detail in US Patent Publication US 20090287678 A1, titled "System and Method for Providing Answers to Questions", by Brown et al., filed May 14, 2008, which is incorporated herein by reference in its entirety.

In QA tools, the quality of the answers determined by the tool (i.e., query results) may depend in part on the quality of the underlying corpus or corpora: the more specific a corpus is to a question domain, the more likely the analytics tool is to find a corresponding answer that has a desirable quality. Therefore, knowledge extractor 330 may rank query results based on their quality in relation to the query. Query results may have associated confidence levels, where a confidence level is an indication of knowledge extractor's 330 determination as to the query result's quality.

According to an example, knowledge extractor 330 may search annotated domain specific corpus 328 using two query terms "competitive strategy fewer than 100 employees", and "typical customer vegetarian", where each of these two query terms may be of the type referred to herein as the third set of query terms, generated at step 412. Knowledge extractor 330 may return documents 1-10 or elements thereof (not shown) from annotated domain specific corpus 328 based on these queries.

At step 418, method 400 may generate, using specific model builder 332, a domain specific model 344 based on results of the querying performed at step 416. Generating domain specific model 344 may include populating a document with elements, sub-elements, and associated data. Elements of domain specific model 344 may be based on elements of documents of the annotated domain specific corpus 328 returned by the knowledge extractor 330. Elements of these documents may be selected based on element selection criteria. The element selection criteria may include, for example, one or more of the following criterion: select an element appearing in the most number of returned documents; select an element of a returned document having a highest rank in the query results; select an element of a returned document that is most verbose; select an element of a returned document that matches the most number of query terms generated at step 412.

When generating specific model 334, specific model builder 332 need not select every element of specific model 344 from elements of documents obtained through a single iteration of step 416 or other steps of method 400. Rather, specific model builder 332 may generate specific model 344 in multiple steps. Accordingly, method 400 may repeat steps of generating first and second sets of query terms (step 408), third set of query terms (step 412), and querying the annotated domain specific corpus 328 (step 416) for each element of specific domain model 344 at a time; or for multiple elements of specific domain model 344 at a time.

Continuing with the example of Restaurant 1, suppose that knowledge extractor 330 returns documents 1-10 or elements thereof (not shown) based on a query, and ranks them in order of how closely each document matches the third set(s) of query terms based on the query criteria. Further suppose that document 4 or an element thereof is the best match. At step 418, specific model builder 332 may generate a business plan for Restaurant 1 based on elements of document 4, or build an element of the specific model based on a corresponding quality element in the query results. Specific model builder 332 may, for example, define "market strategy" for Restaurant 1 the same way as "market strategy" it is defined in document 4, and add this element and its associated data (e.g., the actual text that explains the market strategy) to domain specific model 344. Specific model builder 332 may define all elements of specific model 334 according to elements of document 4. Alternatively, specific model builder 332 may use fewer than all elements of document 4.

Method 400 may also analyze domain specific model 344 using a simulator 340 (this step is not shown in FIG. 4). Simulator 340 may perform domain specific simulations using elements of domain specific model 344, and may communicate results of the simulations to user 342 via controller 336. The simulation may be based on defined relationships contained in a simulation database (not shown). User 342 may interact with controller 336 to cause method 400 and program 238 to iteratively generate or regenerate domain specific model 344 (or multiple instances thereof) so that User 342 may analyze and compare them, and to determine whether domain specific model 344 is a desirable model.

Continuing with the example of Restaurant 1, where domain specific model 344 is a business plan for Restaurant 1, simulator 340 may analyze elements of Restaurant 1's business plan (generated by method 400) to determine how many customers Restaurant 1 needs to attract in order to have a desired level of market penetration. The defined relationships that guide simulator's 340 simulations may include, for example: an increase in market penetration of 5% within first year of operations for a typical restaurant business in geographical area A requires advertising at 10% of operating budget." Simulator 340 may analyze elements of domain specific model 344 that relate to Restaurant 1's operating budget to determine whether Restaurant 1 can afford allocating 10% of its operating budget to advertising, or it may determine what sources of capital are available to Restaurant 1 for raising enough capital to make such an allocation. Simulator 340 may also advise Restaurant 1 of alternative strategies for increasing market penetration, or may advise Restaurant 1 to adopt a different business plan to allow for market penetration of 5% because a given domain specific model 344 under consideration by User 342 does not facilitate this goal.

In a related embodiment, simulator 340 may receive a set of minimum requirements to be applied to domain specific model 344. If simulator 340 determines that domain specific model 344 does not meet the set of minimum requirements, simulator 340 may cause method 400 to rebuild the domain specific model 334. For example, simulator 340 may cause method 400 to select alternative query terms, or to use alternative documents of annotated domain specific corpus 328 to populate elements of domain specific model 344.

Figure 5:
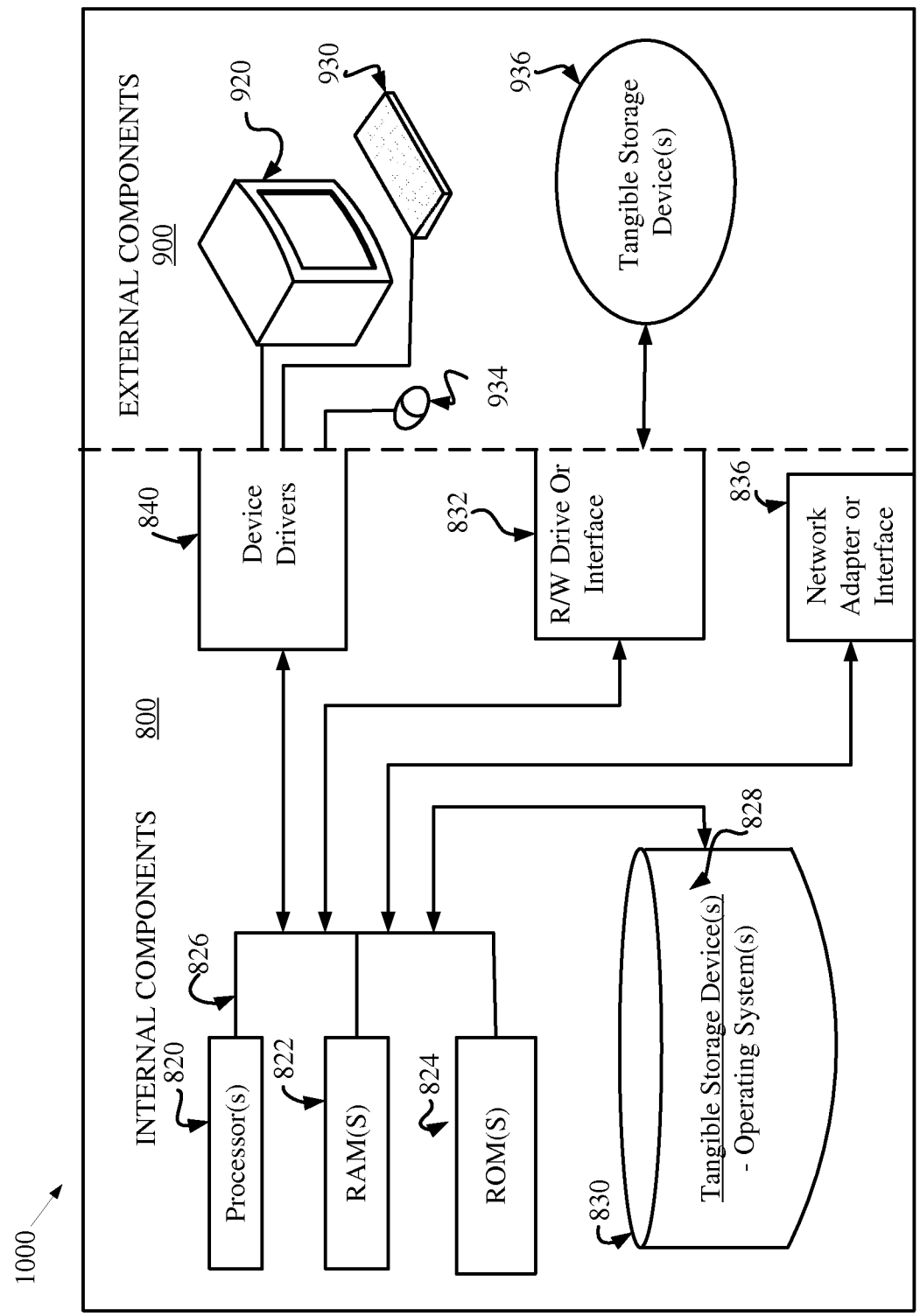
FIG. 5 is a schematic block diagram of the computer system of FIGS. 2-3, in accordance with an embodiment of the present disclosure.

Referring now to FIG. 5, a computing device 1000 (e.g., the computer system in FIG. 1) may include respective sets of internal components 800 and external components 900. Each of the sets of internal components 800 includes one or more processors 820; one or more computer-readable RAMs 822; one or more computer-readable ROMs 824 on one or more buses 826; one or more operating systems 828; one or more software applications (e.g., device driver modules) executing the program x38; and one or more computer-readable tangible storage devices 830. The one or more operating systems 828 and device driver modules are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a thin provisioning storage device, CD-ROM, DVD, SSD, memory stick, magnetic tape, magnetic disk, optical disk or semiconductor storage device. The R/W drive or interface 832 may be used to load the device driver 840 firmware, software, or microcode to tangible storage device 936 to facilitate communication with components of computing device 1000.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 1000, can be downloaded to computing device 1000 from an external computer (e.g., server) via a network (for example, the Internet, a local area network or wide area network) and respective network adapters or interfaces 836. From the network adapters (or switch port adapters) or interfaces 836 and operating system 828 associated with computing device 1000 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Figure 6:
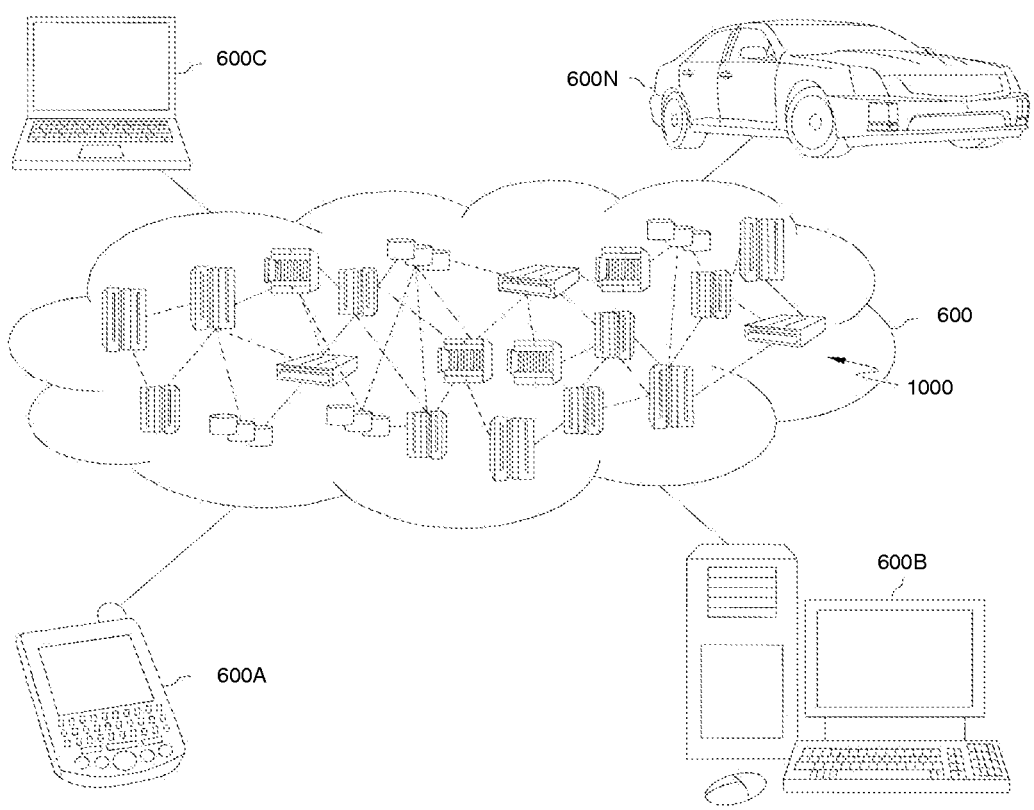
FIG. 6 is a block diagram of an illustrative cloud computing environment including the computer system depicted in FIGS. 2-3 and 5, in accordance with an embodiment of the present disclosure.

Referring now to FIG. 6, an illustrative cloud computing environment 600 is depicted. As shown, the cloud computing environment 600 comprises one or more cloud computing nodes, each of which may be a system 1000 with which local computing devices used by cloud consumers, such as, for example, a personal digital assistant (PDA) or a cellular telephone 600A, a desktop computer 600B, a laptop computer 600C, and/or an automobile computer system 600N, may communicate. The nodes 1000 may communicate with one another. They may be grouped (not shown) physically or virtually, in one or more networks, such as Private, Community, Public, or Hybrid clouds as described hereinabove, or a combination thereof. This allows the cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that the computing nodes 1000 and the cloud computing environment 600 can communicate with any type of computerized device over any type of network and/or network addressable connection (e.g., using a web browser).

Figure 7:
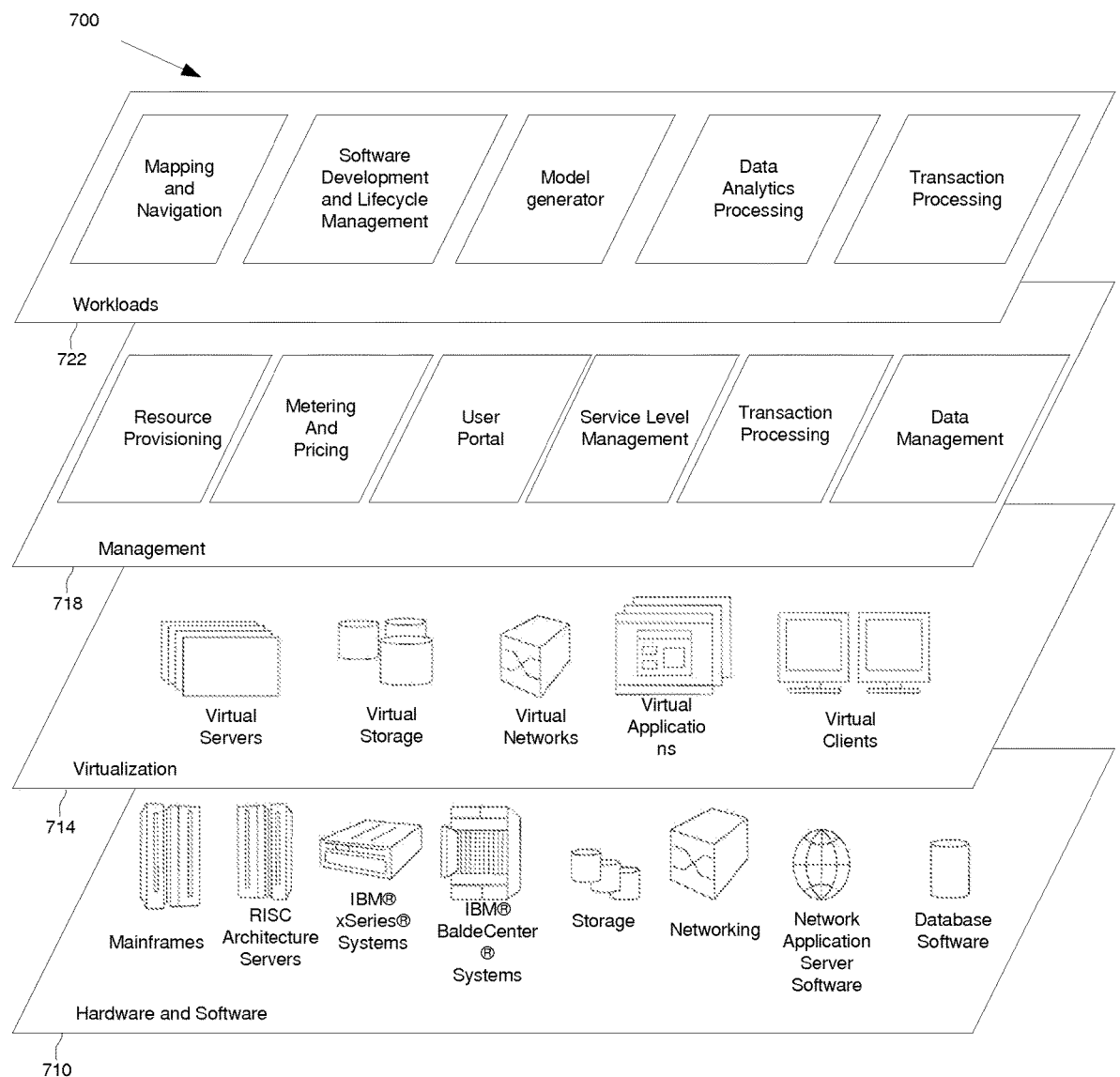
FIG. 7 is a block diagram of functional layers of the illustrative cloud computing environment of FIG. 6, in accordance with an embodiment of the present disclosure.

Referring now to FIG. 7, a set of functional abstraction layers 700 provided by the cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided.

The hardware and software layer 710 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 714 provides an abstraction layer from which the following examples of virtual entities may be provided: virtual servers; virtual storage; virtual networks, including virtual private networks; virtual applications and operating systems; and virtual clients.

In one example, the management layer 718 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 722 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a tool data model generation, such as that provided for by embodiments of the present disclosure described in FIGS. 1-4.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A computer implemented method for generating an electronic document using specific model of a domain, comprising:
   receiving (i) a first model associated with a user, (ii) a generic model of a generic domain, and (iii) a specific domain having an associated domain-specific corpus, wherein the specific domain depends from the generic domain in a domain hierarchy, and wherein the specific domain and the associated domain specific corpus are identified using elements of the first model;
   generating a first set of query terms based on elements of the first model, and a second set of query terms based on elements of the generic model;
   generating a third set of query terms based on the first and second sets of query terms;
querying the domain specific corpus using the third set of query terms;
   generating a domain specific model based on results of the querying; and
   generating an electronic document using the domain specific model.

2. The method of claim 1, wherein querying the annotated domain specific corpus comprises:
   providing the third set of query terms to a deep question and answer tool (DeepQA tool); and
   receiving results of a query by the DeepQA tool using the third set of query terms.

3. The method of claim 2, further comprising:
   providing the results of the query to a user;
   receiving one or more additional elements of the first model from the user;
   revising the third set of query terms based on the one or more additional elements of the first model received from the user;
   querying the domain specific corpus using the revised third set of query terms; and
regenerating the specific model based on results of the querying the domain specific corpus using the revised third set of query terms.

4. The method of claim 1, wherein the generic domain is a root node in a domain hierarchy, and one or more nodes in the domain hierarchy are associated with corresponding data models.

5. The method of claim 1, wherein the generic domain includes a business domain.

6. The method of claim 5, wherein a corresponding data model of the business domain is a business plan.

7. The method of claim 1, further comprising:
   performing a domain specific simulation, based on defined relationships contained in a simulation database, using elements of the domain specific model.

8. A computer system for generating an electronic document using specific model of a domain, comprising:
   a computer having a processor and a computer-readable storage device;
   a program embodied on the storage device for execution by the processor, the program having a plurality of program modules, the program modules including:
   a receiving module configured to identify (i) a first model associated with a user, (ii) a generic model of a generic domain, and (iii) a specific domain having an associated domain-specific corpus, wherein the specific domain depends from the generic domain in a domain hierarchy, and wherein the specific domain and the associated domain specific corpus are identified using elements of the first model;
   a first generating module configured to generate a first set of query terms based on elements of the first model, and a second set of query terms based on elements of the generic model;
   a second generating module configured to generate a third set of query terms based on the first and second sets of query terms;
   a querying module configured to the domain specific corpus using the third set of query terms;
   a third generating module configured to generate a domain specific model based on results of the querying; and
   a fourth generating an electronic document using the domain specific model.

9. The system of claim 8, wherein the querying module further comprises:
   a providing module configured to provide the third set of query terms to a deep question and answer tool (DeepQA tool); and
   a receiving module configured to receive results of a query by the DeepQA tool using the third set of query terms.

10. The system of claim 8, wherein the program modules further comprise:
   a providing module configured to provide the results of the query to a user;
   a receiving module configured to receive one or more additional elements of the first model from the user;
   a revising module configured to the third set of query terms based on the one or more additional elements of the first model received from the user;
an additional querying module configured to query the domain specific corpus using the revised third set of query terms; and
   a regenerating module configured to regenerate the specific model based on results of the querying the domain specific corpus using the revised third set of query terms.

11. The system of claim 8, wherein the generic domain is a root node in a domain hierarchy, and one or more nodes in the domain hierarchy are associated with corresponding data models.

12. The system of claim 8, wherein the generic domain includes a business domain.

13. The system of claim 12, wherein a corresponding data model of the business domain is a business plan.

14. The system of claim 8, further comprising:
a simulating module configured to simulate a domain specific simulation, based on defined relationships contained in a simulation database, using elements of the domain specific model.

15. A computer program product for generating an electronic document using specific model of a domain, comprising a computer-readable storage medium having program code embodied therewith, the program code executable by a processor of a computer to perform a method comprising:
receiving, by the processor, (i) a first model associated with a user, (ii) a generic model of a generic domain, and (iii) a specific domain having an associated domain-specific corpus, wherein the specific domain depends from the generic domain in a domain hierarchy, and wherein the specific domain and the associated domain specific corpus are identified using elements of the first model;
generating, by the processor, a first set of query terms based on elements of the first model, and a second set of query terms based on elements of the generic model;
generating a third set of query terms based on the first and second sets of query terms;
querying the domain specific corpus using the third set of query terms;
generating a domain specific model based on results of the querying; and
generating an electronic document using the domain specific model.

16. The computer program product of claim 15, wherein querying the annotated domain specific corpus comprises:
providing, by the processor, the third set of query terms to a deep question and answer tool (DeepQA tool); and
receiving, by the processor, results of a query by the DeepQA tool using the third set of query terms.

17. The computer program product of claim 15, further comprising:
providing, by the processor, the results of the query to a user;
receiving, by the processor, one or more additional elements of the first model from the user;
revising, by the processor, the third set of query terms based on the one or more additional elements of the first model received from the user;
querying, by the processor, the domain specific corpus using the revised third set of query terms; and
regenerating, by the processor, the specific model based on results of the querying the domain specific corpus using the revised third set of query terms.

18. The computer program product of claim 15, wherein the generic domain is a root node in a domain hierarchy, and one or more nodes in the domain hierarchy are associated with corresponding data models.

19. The computer program product of claim 15, wherein the generic domain includes a business domain.

20. The computer program product of claim 15, further comprising:
performing, by the processor, a domain specific simulation, based on defined relationships contained in a simulation database, using elements of the domain specific model.

* * * * *